Feb. 7, 1956  J. F. CHVOSTA  2,733,944
SPRING CATCH FOR CABINET DOORS AND THE LIKE
Filed April 9, 1953
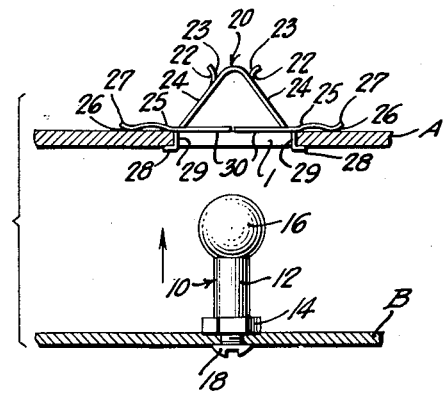
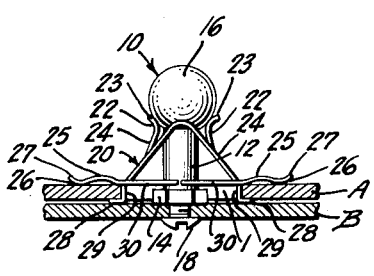
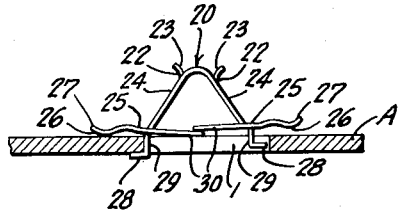
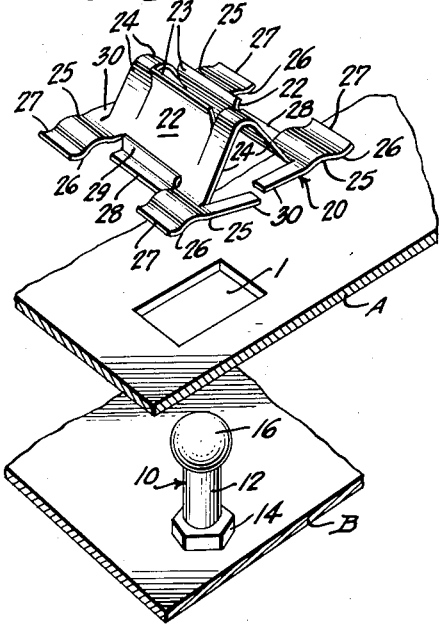
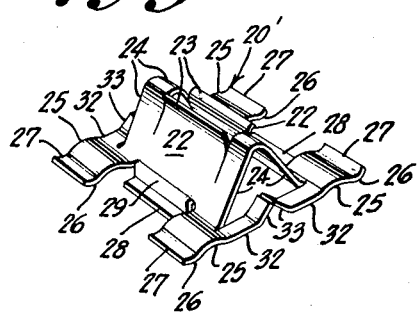
INVENTOR
JERRY F. CHVOSTA
BY
ATTORNEY

United States Patent Office 2,733,944
Patented Feb. 7, 1956

2,733,944

SPRING CATCH FOR CABINET DOORS AND THE LIKE

Jerry F. Chvosta, Cleveland, Ohio, assignor to Tinnerman Products, Inc., Cleveland, Ohio, a corporation of Ohio Application April 9, 1953, Serial No. 347,675

12 Claims. (Cl. 292—17)

This invention relates to spring catches for doors, drawers and similar swinging or sliding closures of cabinets, or the like, and deals with an improved construction of the spring catch disclosed in U. S. Patent Number 2,151,284, issued March 21, 1939.

The invention is directed, more particularly, to improved constructions for a spring catch of this character as provided with a clip type attaching means comprising a pair of cooperating hooks for attaching the spring catch in an opening in a supporting part together with means providing for an automatic positive lock of said hooks in attached position in said opening in the supporting part without the use of tools or special operations for locking the spring catch in attached position. The arrangement is such that a spring catch in accordance with the invention is adapted to be easily and quickly applied to a self-retained, positively locked attachment in an opening in a supporting part, solely by the fingers of a worker, in a manner which eliminates the need for separate bolts or screws for attaching the spring catch, while otherwise saving much of the time and effort required for attaching such a spring catch when provided with special attaching means that must be manipulated by a tool in a special operation for securing the spring catch in attached position.

A primary object of the invention, therefore, is to provide an improved construction for a spring catch of the kind described having a clip type attaching means comprising a pair of cooperating hooks for attaching the spring catch in an opening in a supporting part together with self-locking means for preventing movement of said hooks in the direction toward removal or displacement from attached position in said opening in the supporting part.

Another object of the invention is to provide an improved construction for a spring catch of this character in which the self-locking means for the attaching hooks comprises one or more locking elements associated with each hook that are adapted for abutting relation with each other in the attached position of the hooks in a manner which resists and prevents movement of said hooks in the direction toward removal or displacement from attached position in the opening in the supporting part.

A further object of the invention is to provide an improved spring catch construction, as aforesaid, wherein the self-locking means for the attaching hooks comprises one or more spring elements associated with each hook in the form of spring fingers, or the like, which are adapted to flex and yield automatically in the application of said hooks to attached position in the opening in the supporting part, and which are adapted for a positive abutting relation with each other in the attached position of said hooks in a manner which resists and prevents movement of said hooks in the direction toward removal or displacement from attached position in the opening in the supporting part.

Further objects and advantages, and other new and useful features in the construction, arrangement and general combination of elements of the improved spring catch of the invention will be apparent as the following description proceeds with reference to the accompanying drawings, for purposes of illustration but not of limitation, in which like reference characters designate like parts throughout, and in which:

Fig. 1 is a sectional view showing a spring catch in accordance with the invention as mounted on a cabinet structure, or the like, in which the door or closure is shown approaching its closed position with the strike carried thereby about to engage the spring catch;

Fig. 2 is a similar view showing the door in closed position with the strike engaged by the spring catch;

Fig. 3 is an exploded perspective view showing the spring catch in position to be attached to its supporting part and the cooperating strike in position for application to the spring catch; and Fig. 4 shows the spring catch of Figs. 1-3, inclusive, as manipulated in the initial application of the attaching books thereof to attached position in an opening in the supporting part.

Fig. 5 is a perspective view of another form of spring catch in accordance with the invention.

Referring now, more particularly, to the drawings, the closure fastener of the present invention is shown in the form of a pair of cooperating snap fastening members comprising a strike 10 and spring catch 20, adapted to be mounted on a pair of opposed, abutting wall members of the usual cabinet casing and door or other closure therefor. The fastening members 10, 20, are so mounted in a completed installation that on closing of the door B, the panels or walls A, B, are in substantially flush contact with each other to provide a uniform, substantially unbroken exterior appearance to the cabinet or other structure. A further advantage of the improved spring catch resides in the fact that the door or other closure B is fully and tightly closed under more than the usual amount of spring tension whereby looseness of the door B in closed position is eliminated and squeaks, rattling and other objectionable noises are prevented.

It will be understood that the cooperating fastening members 10, 20, may be mounted as desired on any pair of separable, abutting wall surfaces, but where employed as a door fastener, they are, of course, preferably secured adjacent superposed free edges of the door and casing. The spring catch 20 is attached in a suitable opening 1 in the supporting part A and such an opening may be formed in any desired configuration. In the present example, the opening 1 is shown provided as a simple rectangular slot of sufficient size to serve both as a passage for the strike 10 and as the means for attaching the spring catch 20 over said opening 1.

The strike 10 is mounted on the door B or other swinging or sliding closure and may be provided in any suitable suitable form for cooperative snap fastening engagement with the spring catch 20, as presently to be described. A preferred form of strike 10 is illustrated and comprises a solid body portion 12 provided with a nut-like tool engaging surface 14 and a reduced shank formed with an annular or ball-type projecting head 16. The said body portion 12 of the strike being solid, is readily tapped to provide an internal thread adapted to receive a bolt or screw 18 for securing the same in desired position on the wall member B.

The spring catch 20 is a relatively simple article of manufacture which may be readily produced at relatively low cost from an inexpensive section of any suitable sheet metal, preferably spring steel or cold rolled steel having spring-like characteristics. The spring catch 20 may be formed from blanks of various outlines but from the standpoint of most economical quantity production is most advantageously provided from a simple generally rectangular blank which may be obtained from standard sheet metal strip stock with little loss or waste of material. The blank or strip forming the spring catch 20 is provided with a central transverse slit intermediate spaced parallel slits on opposite sides thereof to provide a pair of elongate spring arms 22 between the spaced body portions 24 and end flanges 25. The blank as thus formed is bent into an inverted V-shape between the end flanges 25 so that said end flanges 25 serve as base portions for the foreshortened body of the fastener. The spaced body portions 24 of the blank thus define a pair of elbows in an inverted V-shaped construction, and the spring arms 22 extend upwardly between said elbows in more or less face to face relation. The spring arms 22, accordingly, comprise opposing surface portions in resilient yieldable, relation to each other and are readily adapted to receive therebetween the ball-head 16 of the cooperating strike 10 in snap fastening engagement therewith.

The spring catch 20 is formed with the spring arms 22 thereof inclined toward each other, as shown, and with the extremities thereof spaced a suitable distance apart and curved or rounded as at 23, to provide substantial cam lips adapted to permit the head 16 of the cooperating stud to readily enter and seat therebetween on being applied thereto in one direction and to resist reverse movement in an opposite direction, but capable of being withdrawn when sufficient reverse axial force is exerted on said strike 10. The spring arms 22 are supported in their inclined relation to each other by the spaced body portions 24, and also by the base flanges 25.

The spring catch 20 is provided with a particularly advantageous and highly practical type of attaching means for attaching the same easily and quickly in the opening 1 in the supporting part A without the use of bolts, screws, rivets or other separate fastening means. Such attaching means are provided in the form of cooperating outwardly extending hooks 28 in integral relation with the spaced body portions 24 and which are stamped from said base flanges 25 to project downwardly out of the plane thereof. The hooks 28 include spaced shoulders 29 having a normal spacing slightly greater than the distance between opposing end walls of the opening 1 in the normal untensioned condition of the spring catch. The hook portions 28 otherwise are so spaced from the base flanges 25 as to cooperate therewith in gripping marginal portions of said opening 1 when applied to final position. To this end, the base flanges 25 preferably are slightly corrugated to define downwardly biased panel engaging cam elements 26 adjacent outwardly flared tongues 27 on the extremities thereof which facilitate the application of the spring catch to attached position with the engaged marginal portions of the panel opening 1.

This construction of the spring catch 20, otherwise, is such that in the attachment thereof in the panel opening 1, one of the hook elements 28 is first applied to gripping engagement with one end of said opening 1 in cooperation with the cam elements 26 on the associated base flanges 25. The flared tongues 27 on the extremities of the flanges 25 facilitate this initial application to a position in which the shoulder 29 of the hook is in abutting engagement with the adjacent end wall of the opening 1, whereupon the V-shaped body of the spring catch is compressed as necessary for the other hook 28 to enter the panel opening 1 and engage the opposite end of the panel opening in a similar manner. The V-shaped body of the spring catch is slightly constricted in such applied position inasmuch as the shoulders 29 of the hooks have a normal spacing greater than the distance between the engaged end walls of the panel opening 1, as aforesaid. Accordingly, the V-shaped body of the spring catch is in slightly tensioned condition in its attached position, and this adds to and increases the spring force of the spring arms 22 in fastening engagement with the cooperating strike 10. The spring catch 20 is thereby adapted for more than the usual amount of spring tension in fastening engagement with the strike 10 such that there is no looseness in the connection and squeaks, rattling and other objectionable noises in the connection are avoided.

The sides of the spaced body portions 24 are of such width that they may be partially severed to provide spring locking elements in the form of flat leaf springs 30 at the sides of the base flanges 25, with the ends of said fingers 30 extending inwardly toward each other in abutting relation. Said spring fingers 30 are of such length and otherwise so provided that when the spaced body portions 24 are compressed to attach the hooks 28 in the generally rectangular opening 1, Fig. 4, said fingers 30 are positioned outside of said opening 1 and are flexed inwardly in bearing engagement against the panel surface A adjacent said opening 1 in a manner whereby the extremities of said spring fingers 30 move toward each other and are positioned in directly opposite abutting relation. The arrangement, accordingly, is such that when the hooks 28 are attached in the opening 1, the extremities of said spring fingers 30 are in directly opposite abutting relation and thereby prevent any inward movement of the spaced body portions 24 toward each other as is necessary to remove said hooks 28 from attached position in said opening 1.

In the normal untensioned relation of the spring catch 20, as shown in Fig. 3, the extremities of the spring fingers 30 preferably are slightly out of line with each other as necessary to permit said extremities to overlap, as shown in Fig. 4, when the spaced body portions 24 of the spring catch are compressed toward each other in the initial application thereof to attach the hooks 28 in the opening 1. In an alternate arrangement, the extremities of said spring fingers 30 may be provided substantially in line with each other and forced out of line to permit such overlapping of said extremities thereof, as shown in Fig. 4.

From the foregoing, it will be understood that in the initial application of the spring catch 20 to attach the hooks 28 in the opening 1, the spaced body portions 24 are compressed toward each other, as shown in Fig. 4, and the spring catch manipulated as necessary to provide an offset, overlapping relation of the extremities of the spring fingers 30 for permitting the hooks 28 to move toward each other. In this relation, the hooks 28 still have their extremities farther apart than the length of the generally rectangular opening 1. Accordingly, one hook 28 is passed through the opening 1 with the other hook 28 resting on the surface of the panel A adjacent said opening 1. The resiliency of the spaced body portions 24 enables the latter hook 28 to be pressed inwardly and sprung sufficiently so that it may also pass through the opening 1 and thus be received in said opening 1. The spaced body portions 24 are then released from their compressed condition and in attempting to assume their initial untensioned outwardly inclined relation, both hooks 28 automatically spread apart to a position in which the shoulders 29 of said hooks positively engage the adjacent marginal edges of the opening 1, with the ends of said hooks 28 engaging the adjacent underside of the panel A adjacent said opening 1. The spaced body portions 24, as thus attached, do not assume their initial untensioned relation but rather, remain biased slightly inwardly in the engaged position of the hooks 28 in the opening 1, such that said hooks 28 are retained in attached position in said opening 1 under continuously effective spring tension.

As the hooks 28 are thus attached in the panel opening 1, the spring fingers 30 bear on the adjacent panel surface A outside of said opening 1 as shown in Figs. 1 and 2. When the spaced body portions 24 are released from their compressed condition to seat said hooks 28 in final attached position in the opening 1, as aforesaid, the extremities of said spring fingers 30 spread apart from their overlapping relation shown in Fig. 4 to that of Fig. 1 where the extremities of said fingers 30 are positioned in directly opposite abutting relation and thereby prevent any movement of the spaced body portions 24 toward each other in a direction which would permit removal or displacement of said hooks 28 from attached position in said opening 1. The hooks 28 are thus positively locked in attached position in the opening 1 in a manner whereby the spring catch is secured in self-retained position against accidental or unintended displacement or removal.

In the described application of the spring catch 20 to a positively locked attachment in the opening 1, it will be appreciated that the device is manipulated solely by the fingers of a worker in a quick and easy operation without the use of tools, thereby providing highly important advantages in assembly line mass production methods of manufacture.

Fig. 5 shows another form of spring catch 20' which is generally similar in construction, application and use to that described with reference to Figs. 1–4, inclusive, but in which the inwardly extending spring fingers 32 at the sides of the device are provided with bent portions on their ends defining resilient abutments 33 in face to face abutting relation. This form of the spring catch is attached similarly to that previously described, and as the spaced body portions 24 thereof are compressed, said abutments 33 yield as necessary to permit the hooks 28 to be attached in the panel opening 1 in the same general way. When the spaced body portions 24 expand in the fully attached position of the hooks 28 in the panel opening 1, said abutments 33 serve to tension said spring fingers 32 in a manner whereby said spring fingers 32 exert a pronounced outward spring force on said attaching hooks 28 in attached position in said opening 1.

With the spring catch 20 and cooperating strike 10 mounted on their respective wall members A, B, in the manner aforesaid, it will be understood that they are thereby adapted to be moved into and out of snap fastening engagement by a substantially straight longitudinal or axial movement as indicated by the arrow in Fig. 1. During this movement, by reason of the annular or ball shaped configuration of the head 16 of the strike 10, the spring arms 22 of the spring catch are caused to gradually spread apart and permit said head 16 to pass therebetween and seat the rounded undersurfaces thereof on the rounded lips 23 on the spring arms 22 in the closed position of the abutting wall members A, B, substantially as shown in Fig. 2. In this relation, the elements in actual contact are the rounded surfaces of the lip elements 23 on the spring arms 22 of the catch engaging the rounded undersurfaces of the ball-shaped head 16 of the strike 10. The strike 10 is thus adapted to effectively engage the spring arms 22 in limited angular relation if necessary, in what may be termed a universal contact, and accordingly, the spring catch 20 and strike 10 may be mounted in various relative positions to have a wide range of use on different types of cabinets and similar structures. A further advantage resides in the fact that should the spring catch and strike be somewhat misaligned to cause the head 16 of the strike to move one of the spring arms 22 more than the other, such inaccuracy is readily compensated for by the engagement of the rounded surfaces of said ball head 16 of the strike in universal, close contact with the curved, rounded surfaces of said lips 23 on the spring arms 22. This arrangement, together with the foreshortened base construction of the spring catch 20 providing for the relatively long spring arms 22, prevents undue distortion and strain in said spring arms 22 and otherwise minimizes danger of fracture of the same by reason of crystallization incidental to constant wear over an extended period of use.

In releasing the members of the catch from the fastened position shown in Fig. 2, a substantial axial pull exerted on the strike 10 causes the rounded undersurfaces of the ball-shaped head 16 thereof to cam the rounded surfaces of the curved lips 23 on the spring arms 22 to spread the same apart and thereby permit said strike 10 to be disconnected from said spring arms 22 and easily and quickly withdrawn to the open position of the door or other closure.

The spring catch preferably is constructed of relatively thin sheet metal the thickness of which is selected according to service requirements and the predetermined size of the members of the closure assembly, or the like. The spring catch is most effective when provided of spring metal suitably tempered and otherwise treated to give the desired toughness and hardness, particularly in the case of devices which are subject to constant wear over a long period of service. A cheap and highly satisfactory spring catch may be made from cold rolled metal such as cold rolled steel which is untempered but of a spring metal nature and capable of providing an effective and reliable spring catch, as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A spring catch comprising a piece of sheet metal bent to define a pair of spaced body portions provided with attaching means for attaching said body portions in a work opening, means on said spaced body portions for interengagement by a cooperating strike, and means comprising an element on one body portion having a free end extending toward the other body portion and adapted to prevent movement of said body portions in the attached position of said attaching means in said work opening, thereby retaining said attaching means against removal or displacement from attached position in said work opening.

2. A spring catch comprising a piece of sheet metal bent to define a pair of spaced body portions provided with hooks for attaching said body portions in a work opening, spring arms on said spaced body portions for interengagement by a cooperating strike, and means comprising an element on one body portion having a free end extending toward the other body portion and adapted to prevent movement of said body portions in the attached position of said hooks in said work opening, thereby retaining said hooks against removal or displacement from attached position in said work opening.

3. A spring catch comprising a piece of sheet metal bent to define a pair of spaced body portions provided with attaching means for attaching the spring catch in a work opening, spring arms on said body portions for interengagement by a cooperating strike, and means on said body portions extending inwardly toward each other and adapted for abutting relation to prevent movement of said body portions in the attached position of said attaching means in said work opening, thereby retaining said attaching means against removal or displacement from attached position in said work opening.

4. A spring catch comprising a piece of sheet metal bent to define a pair of spaced body portions provided with outwardly extending hooks for attaching the spring catch in a work opening, spring arms on said body portions for interengagement by a cooperating strike, and means on said body portions adapted for abutting relation to prevent movement of said body portions toward each other in the attached position of said hooks in said work opening, thereby retaining said hooks against removal or displacement from attached position in said work opening.

5. A spring catch comprising a piece of sheet metal bent to define a pair of spaced body portions provided with outwardly extending hooks for attaching the spring catch in a work opening, spring arms on said body portions for interengagement by a cooperating strike, and elements on said body portions having free ends extending inwardly toward each other and adapted for abutting relation to prevent movement of said body portions toward each other in the attached position of said hooks in said work opening, thereby retaining said hooks against removal or displacement from attached position in said work opening.

6. A spring catch comprising a piece of sheet metal bent to define a pair of spaced body portions provided with outwardly extending hooks for attaching the spring catch in a work opening, spring arms on said body portions for interengagement by a cooperating strike, and elements on said body portions at opposite sides of said hooks having free ends extending inwardly toward each other and adapted for abutting relation to prevent movement of said body portions toward each other in the attached position of said hooks in said work opening, thereby retaining said hooks against removal or displacement from attached position in said work opening.

7. A spring catch comprising a piece of sheet metal bent to define a pair of spaced body portions provided with outwardly extending hooks for attaching the spring catch in a work opening, spring arms on said body portions for interengagement by a cooperating strike, and elements on said body portions at opposite sides of said hooks comprising substantially flat spring fingers extending inwardly toward each other and having their extremities adapted for abutting relation to prevent movement of said body portions toward each other in the attached position of said hooks in said work opening, thereby retaining said hooks against removal or displacement from attached position in said work opening.

8. A spring catch comprising a piece of sheet metal bent to define a pair of spaced body portions provided with outwardly extending hooks for attaching the spring catch in a work opening, spring arms on said body portions for interengagement by a cooperating strike, outwardly extending flanges carried by said body portions on opposite sides of said hooks, and elements on said flanges having free ends extending inwardly toward each other and adapted for abutting relation to prevent movement of said body portions toward each other in the attached position of said hooks in said work opening, thereby retaining said hooks against removal or displacement from attached position in said work opening.

9. A spring catch comprising a piece of sheet metal bent to define a pair of spaced body portions provided with outwardly extending hooks for attaching the spring catch in a work opening, spring arms on said body portions for interengagement by a cooperating strike, outwardly extending flanges carried by said body portions at opposite sides of said hooks, and substantially flat spring fingers carried by said flanges, said fingers having free ends and extending inwardly toward each other with their extremities adapted for abutting relation to prevent movement of said body portions toward each other in the attached position of said hooks in said work opening, thereby retaining said hooks against removal or displacement from attached position in said work opening.

10. A spring catch comprising a piece of sheet metal bent to define a pair of spaced body portions provided with outwardly extending hooks for attaching the spring catch in a work opening, spring arms on said body portions for interengagement by a cooperating strike, and elements carried by said body portions having free ends extending inwardly toward each other and provided with resilient abutments adapted for abutting relation to prevent movement of said body portions toward each other in the attached position of said hooks in said work opening, thereby retaining said hooks against removal or displacement from attached position in said work opening.

11. A spring catch comprising a piece of sheet metal bent to define a pair of spaced body portions provided with outwardly extending hooks for attaching the spring catch in a work opening, spring arms on said body portions for interengagement by a cooperating strike, outwardly extending flanges carried by said body portions on opposite sides of said hooks, and elements on said flanges having free ends extending inwardly toward each other and provided with resilient abutments adapted for abutting relation to prevent movement of said body portions toward each other in the attached position of said hooks in said work opening, thereby retaining said hooks against removal or displacement from attached position in said work opening.

12. A spring catch comprising a piece of sheet metal bent to define a pair of spaced body portions provided with outwardly extending hooks for attaching the spring catch in a work opening, spring arms on said body portions for interengagement by a cooperating strike, outwardly extending flanges carried by said body portions at opposite sides of said hooks and substantially flat spring fingers carried by said flanges, said fingers having free ends extending inwardly toward each other and provided with resilient abutments adapted for abutting relation to prevent movement of said body portions toward each other in the attached position of said hooks in said work opening, thereby retaining said hooks against removal or displacement from attached position in said work opening.

References Cited in the file of this patent

UNITED STATES PATENTS

| 2,342,831 | Borchers | Feb. 29, 1944 |
| 2,521,317 | Waara | Sept. 5, 1950 |

FOREIGN PATENTS

| 527,826 | Great Britain | Oct. 16, 1940 |